July 1, 1958

T. J. NEWMAN 2,841,751

TURRET CONTROL

Filed Dec. 3, 1954

INVENTOR.
THEODORE J. NEWMAN
BY
Raymond A. Paquin
ATTORNEY.

United States Patent Office 2,841,751
Patented July 1, 1958

2,841,751
TURRET CONTROL

Theodore J. Newman, Forest Hills, N. Y., assignor to American Bosch Arma Corporation, a corporation of New York Application December 3, 1954, Serial No. 472,889

4 Claims. (Cl. 318—77)

This invention relates to gun turret controls and has particular reference to means for driving a turret at a given angular rate.

Integrating gyroscopes have been used to control turrets before, but these prior systems have required constant amplitude and constant frequency power supplies. These devices have operated on a principle whereby the precessional torque of the gyroscope acting about the output axis during an angular turn of the turret about the input axis counteracts a torque proportional to a predetermined rate which is applied about the output axis by a torque motor. When the two torques are equal, the turret is rotating at the predetermined rate. This type of control requires elements of high precision for reasonable accuracy.

The present invention, however, works on the principle whereby the gyroscope is rotated with respect to the turret at a given rate to produce a precessional torque which is counteracted by driving the turret in space at a rate sufficient to reduce the precessional torque of the gyro to zero. Since the gyroscope is operating essentially as a nulling device it is not unduly sensitive to power supply fluctuations.

Figure 1:
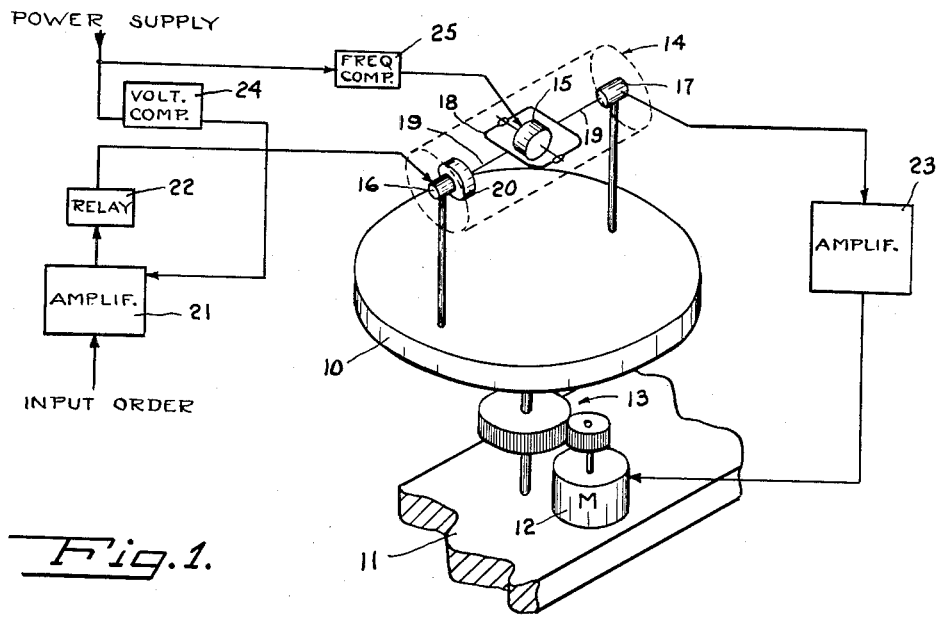
Figure 2:
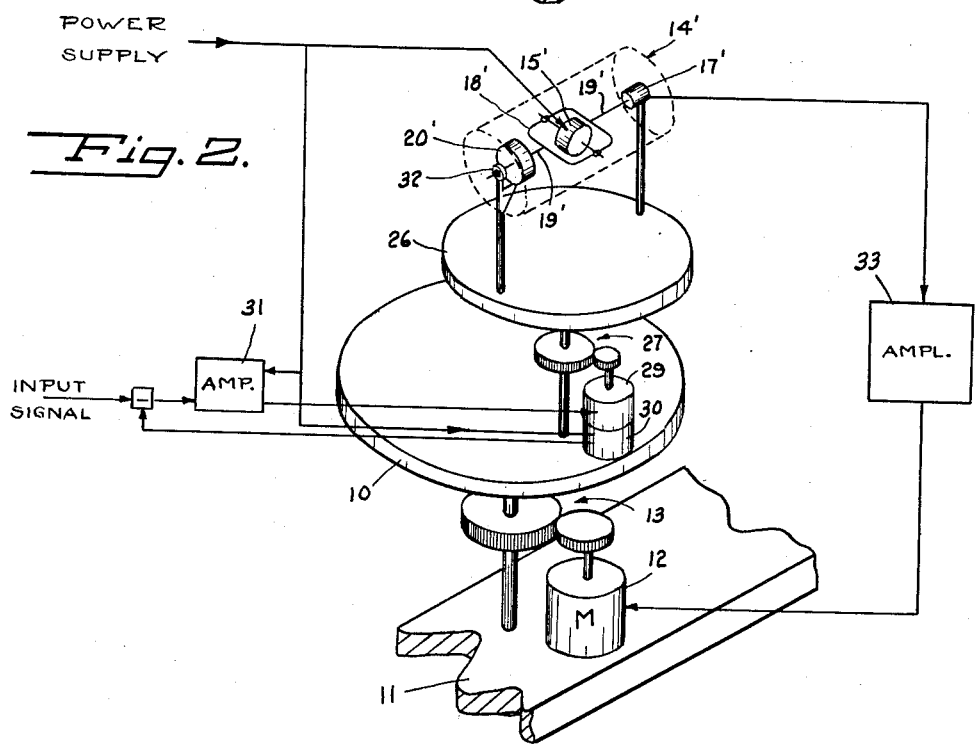

For a better understanding of the invention reference may be had to the accompanying diagrams, in which, Fig. 1 is a schematic diagram of the old method of turret control, and Fig. 2 is a schematic diagram of the turret control provided by this invention.

Referring now to Fig. 1 of the drawings, the numeral 10 denotes a gun turret platform carried on an aircraft, for example, a portion of which is shown as airframe 11. The turret platform 10 is driven with respect to the airframe 11 by the motor 12 through gearing 13. Turret 10 carries an integrating gyro 14 which includes the gyroscope 15, torque motor 16 and pickoff device 17. The gyroscope 15 is journaled in the gimbal ring 18, the shafts 19, 19 of which are connected to the rotors of the torque motor 16 and pickoff 17. The stators of these devices 16 and 17 are supported on the platform 10. Interposed between the gimbal shafts 19 and the stator of motor 16 is a viscous damping device 20, or the equivalent thereof. In accordance with accepted nomenclature, the output axis of the integrating gyro 14 is along shafts 19, 19, while the input axis is along the axis mutually perpendicular to the output axis and the gyro spin axis.

In operation of this known type of rate control, an input order signal is applied to the torque motor 16 through an amplifier 21 and a relay 22. The order signal is proportional in magnitude and corresponding in sense to the desired rate of turn of the turret 10 so that motor 16 applies a torque to shafts 19 which displaces the rotor of pickoff 17 accordingly. The output of pickoff device 17 energizes motor 12 through amplifier 23, and motor 12 begins to drive the turret platform 10 and the integrating gyro 14. Rotation of platform 10 causes gyro 15 to produce a precessional torque in the direction to oppose the torque of motor 16 on shafts 19 thereby reducing the displacement of the rotor of pickoff 17. A steady state will be reached when the torques are equalized and the turret 10 is rotating in space at the desired rate. It will be seen that for accuracy, the power to the windings of torque motor 16 must be of constant magnitude, and to insure this a compensator 24 is required. Also, the angular momentum of the gyro 18 is critical and to maintain this at a constant value, the frequency of the energizing supply must be maintained constant when a synchronous motor is used to drive the gyro wheel. Hence, a frequency regulator 25 must be used on the power supplied to gyro 18. The operation of torque motor 16 will be impaired when the control signal is excessive, and for this reason the relay 22 is interposed between the motor 16 and amplifier 21. If the order signal is too high, the relay 22 is actuated to apply a constant signal of suitable magnitude to the motor 16, until such time that the order signal has decreased to a usable value.

The present invention eliminates the necessity for the precision voltage supply, the electronic relay, and the torque motor plus precision torque motor amplifier and adds only a precision tachometer and a non-precision motor amplifier. Referring now to Fig. 2, which shows the present invention, the turret 10 is driven as in Fig. 1 by motor 12 through gearing 13. A platform 26, rotatable with respect to the turret 10, is driven through gearing 27 by the motor 29 which is supported by turret 10. The motor 29 also drives the rotor of tachometer or generator 30. The output of generator 30 is fed-back degeneratively with the input order signal to the amplifier 31, the output of which energizes motor 29. Thus, in the well-known manner, the platform 26 is rotated at a predetermined rate, proportional to the order signal, relatively to the turret 10.

Platform 26 carries integrating gyro 14' which is the same as integrating gyro 14, except that torque motor 16 is omitted. Thus, platform 26 supports the stator of pickoff device 17', the rotor of which is attached to one shaft 19' of the gyroscope gimbal ring 18'. The other shaft 19' is journaled in the bearing 32 which is carried by platform 26 while a fluid damp 20' or the equivalent is interposed between shaft 19' and the support for bearing 32. Rotation of platform 26, produced by motor 29, causes precession of the gyroscope 15' which in turn produces an output voltage proportional to the displacement of the gyro 15' about the axis of shafts 19', 19' at the pickoff 17'. The output of pickoff 17' energizes the motor 12 through the turret drive amplifier 33 so that motor 12 drives the turret 10 and the platform 26 in the direction tending to cancel the rotation of platform 26. The characteristics of the turret drive amplifier 33 are preferably such that the motor 12 will drive the turret 10 at a rate proportional to the output of pickoff 17'.

To describe the operation of the present invention, assume that the airframe 11, turret 10 and platform 26 are all non-rotating initially. An order signal applied to the integrating servo or motor generator 29—30 causes motor 29 to drive the platform 26 at a rate proportional to the order signal. The rotation of platform 26 causes the gyroscope 15' to precess about the axis through shafts 19', 19' thereby displacing the rotor of pickoff 17'. The output of pickoff 17' causes motor 12 to drive the turret to oppose the rotation of platform 26. Eventually the displacement of gyroscope 15' will be sufficient to keep the turret 10 rotating in space at a speed equal to the rotation of platform 26 with respect to the turret 10 and the gyroscope 15' will be stationary in space. In this condition the turret 10 is rotating at the desired rate.

It will be seen that the integrating gyro 14' operates as a null device and its accuracy will not be seriously affected by line voltage and frequency fluctuations even though its sensitivity might be affected. The only precision device required in the device shown in Fig. 2 is the integrating servo 29, 30 which controls the rate of rotation of platform 26 with respect to the turret 10. Accordingly, as seen in Fig. 2, the power supply may be connected directly to the gyro 15', amplifier 31 and generator 30, instead of through the frequency and voltage compensators required in the device of Fig. 1.

It should be realized that the output of pickoff 17' can alternatively be used to control the acceleration of motor 12 instead of its speed. In this case the turret drive amplifier 33 will contain auxiliary equipment to modify the output of pickoff device 17' whereby a constant voltage will energize motor 12 after turret 10 has come up to speed and the output of pickoff device 17' is zero. Such equipment is beyond the scope of the present invention, however, and will not be described in more detail.

I claim:

1. In a device of the character described, a support, a turret carried by said support and rotatable with respect thereto, a platform carried by said turret, motive means carried by said turret and operatively connected to said platform for rotating said platform relative to said turret at a predetermined rate, an integrating gyroscope carried by said platform, a pickoff unit on said gyroscope, second motive means carried by said support and operatively connected to said turret, and electrical connections between said pickoff unit and said second motive means for energizing said second motive means for controlling the rotation of said turret.

2. In a device of the character described, a support, a turret carried by said support and rotatable with respect thereto, a platform carried by said turret, motive means carried by said turret and operatively connected to said platform for rotating said platform relative to said turret at a predetermined rate, an integrating gyroscope carried by said platform, a pickoff unit on said gyroscope, a second motive means carried by said support and operatively connected to said turret, and electrical connections between said pickoff unit and said second motive means for energizing said second motive means for controlling the rotation of said turret, said means for rotating said platform including a motor and a generator driven by said motor, said generator energizing said motor jointly with an input signal proportional to said predetermined rate.

3. In a device of the character described, a support, a turret carried by said support and rotatable with respect thereto, a platform carried by said turret, motive means carried by said turret and operatively connected to said platform for rotating said platform relative to said turret at a predetermined rate, an integrating gyroscope carried by said platform having its input axis parallel to the rotational axis of said turret, a pickoff unit on said gyroscope, second motive means carried by said support and operatively connected to said turret, and electrical connections between said pickoff unit and said second motive means for energizing said second motive means for controlling the rotation of said turret.

4. In a device of the character described, a support, a turret carried by said support and rotatable with respect thereto, a platform carried by said turret, motive means carried by said turret and operatively connected to said platform for rotating said platform relative to said turret at a predetermined rate, an integrating gyroscope carried by said platform having its input axis parallel to the rotational axis of said turret, a pickoff unit on said gyroscope, second motive means carried by said support and operatively connected to said turret, and electrical connections between said pickoff unit and said second motive means for energizing said second motive means for controlling the rotation of said turret, said means for rotating said platform including a motor and a generator driven by said motor, said generator energizing said motor jointly with an input signal proportional to said predetermined rate.

References Cited in the file of this patent
UNITED STATES PATENTS

| | | |
|---|---|---|
| 2,162,482 | Hanna | June 13, 1939 |
| 2,242,253 | Lyman | May 20, 1941 |
| 2,650,338 | Meredith et al. | Aug. 25, 1953 |